United States Patent
Takahashi et al.

(10) Patent No.: US 7,739,011 B2
(45) Date of Patent: Jun. 15, 2010

(54) VEHICLE MOTION STATE CONTROL DEVICE

(75) Inventors: Susumu Takahashi, Saitama (JP); Tohru Ikeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1138 days.

(21) Appl. No.: 11/363,488

(22) Filed: Feb. 27, 2006

(65) Prior Publication Data

US 2006/0197377 A1    Sep. 7, 2006

(30) Foreign Application Priority Data

Mar. 3, 2005 (JP) .............................. 2005-059511

(51) Int. Cl.
*B62D 6/00* (2006.01)

(52) U.S. Cl. .......................... 701/41; 180/421

(58) Field of Classification Search ................... 701/41, 701/36, 37, 38, 51, 70–74, 78–80; 180/421–446
See application file for complete search history.

(56) References Cited

U.S. PATENT DOCUMENTS

| | | | | |
|---|---|---|---|---|
| 4,834,205 A | * | 5/1989 | Mizuno et al. ............ | 180/422 |
| 5,615,117 A | * | 3/1997 | Serizawa .................. | 701/42 |
| 5,734,570 A | * | 3/1998 | Arlandis ................... | 701/42 |
| 5,893,896 A | * | 4/1999 | Imamura et al. .......... | 701/70 |
| 6,698,542 B2 | * | 3/2004 | Nishizaki et al. ......... | 180/403 |

FOREIGN PATENT DOCUMENTS

JP          3214826          7/2001

* cited by examiner

*Primary Examiner*—Dalena Tran
(74) *Attorney, Agent, or Firm*—Carrier, Blackman & Associates P.C.; William D. Blackman; Joseph P. Carrier

(57) ABSTRACT

A vehicle motion state control device controls an actuator capable of regulating a vehicle motion state so that an actual yaw rate approaches a target yaw rate determined based on a steer angle and a vehicle speed, target yaw rate limit values for left and right turn directions of a vehicle are individually determined by a target yaw rate limit value determining mechanism based on detected lateral acceleration, detected vehicle speed, and predetermined set minimum lateral acceleration set in a direction opposite to that of the detected lateral acceleration; and target yaw rates for the left and right turn directions are determined by a target yaw rate determining mechanism while limiting them by the determined target yaw rate limit values. Thus, an oversteer control is started at an early timing when an abrupt steering operation at a large steer angle occurs which causes a phase difference to the yaw rate and the lateral acceleration.

10 Claims, 5 Drawing Sheets

VEHICLE MOTION STATE CONTROL DEVICE

RELATED APPLICATION DATA

Japanese priority application No. 2005-59511, upon which the present application is based, is hereby incorporated in its entirety herein by reference.

BACKGROUND OF THE INVENTION

1. Field of the Invention

The present invention relates to a vehicle motion state control device that controls an actuator capable of regulating a motion state of a vehicle so that an actual yaw rate approaches a target yaw rate determined based on a steer angle and a vehicle speed.

2. Description of the Related Art

Such a vehicle motion state control device is already known from, for example, Japanese Patent No. 3214826.

However, in the motion state control device disclosed in Japanese Patent No. 3214826, the limit lateral acceleration is estimated based on the fact that the lateral acceleration converted into an absolute value corresponds to a friction coefficient of a road surface, and a revolution angular speed determined by (lateral acceleration/vehicle speed) is set as a control target yaw rate whether the turning direction is left or right. Therefore, after the steering operation by a vehicle driver, an over steer control is not started until the yaw rate exceeds the revolution angular speed in the reverse direction. Therefore, when an abrupt steering operation at a large steer angle which causes a phase difference to yaw rate and lateral acceleration is performed, the over steer control is not started in some cases even when the yaw rate (rotation speed) is obviously large with respect to a locus angle rate (revolution speed) of the vehicle.

SUMMARY OF THE INVENTION

The present invention has been achieved in view of the above circumstances, and has an object to provide a vehicle motion state control device in which an over steer control is started at an early timing when an abrupt steering operation at a large steer angle which causes a phase difference to a yaw rate and a lateral acceleration is performed.

In order to achieve the above object, according a first feature of the present invention, there is provided a vehicle motion state control device comprising: a steer angle detector which detects a steer angle; a vehicle speed detector which detects a vehicle speed; a target yaw rate determining mechanism which determines a target yaw rate of a vehicle based on the detected steer angle and the detected vehicle speed; a yaw rate detector which detects an actual yaw rate; an actuator capable of regulating a vehicle motion state; an actuator controller which controls the actuator so that the detected actual yaw rate approaches the target yaw rate; a lateral acceleration detector which detects lateral acceleration; and a target yaw rate limit value determining mechanism for individually determining target yaw rate limit values for a left turn direction and a right turn direction of the vehicle based on the detected lateral acceleration, the detected vehicle speed and a predetermined limit lateral acceleration set in a direction opposite from a direction of the detected lateral acceleration, and wherein the target yaw rate determining mechanism determines the target yaw rates for the left turn and the right turn directions of the vehicle while limiting them by the determined target yaw rate limit values for the left turn and right turn directions of the vehicle.

With the present invention, a predetermined set minimum lateral acceleration is also set in the direction opposite from that of the detected lateral acceleration without need of converting the detected lateral acceleration into an absolute value; the target yaw rate limit values are individually set for the left turn and right turn directions of the vehicle based on the set minimum lateral acceleration, the detected lateral acceleration, and the detected vehicle speed; and the target yaw rates for the left turn and right turn directions are set while limiting them by the target yaw rate limit values. Therefore, the target yaw rates determined after an abrupt steering operation at a large steer angle which causes a phase difference between the yaw rate and the lateral acceleration becomes smaller than the conventional device, so that the over steer control is started at an early timing.

The above-mentioned object, other objects, characteristics, and advantages of the present invention will become apparent from a present exemplary embodiment, which will be described in detail below with reference to the attached drawings.

DESCRIPTION OF THE PRESENT EMBODIMENT

An exemplary embodiment of the present invention will be described below with reference to the attached drawings.

Figure 1:
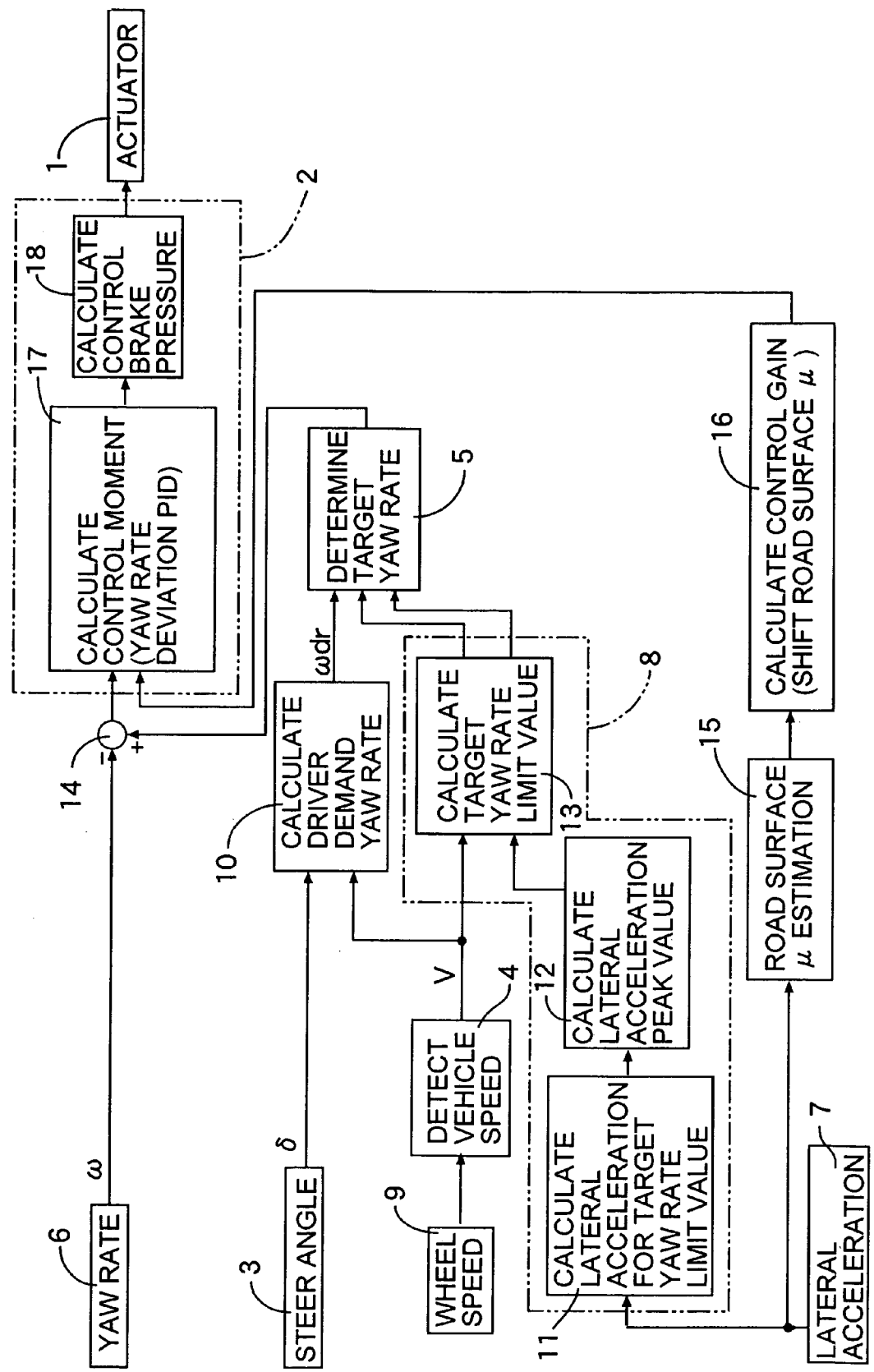
FIG. 1 is a block diagram showing a construction of a motion state control device according to an embodiment of the present invention.

First, referring to FIG. 1, in the motion state control device, an actuator controller 2 controls an operation of an actuator 1 capable of changing brake pressure of a wheel brake mounted on each wheel of a vehicle, in order to change the wheel brake pressure to thereby regulate a motion state of the vehicle. The motion state control device includes: a steer angle detector 3 that detects a steer angle $\delta$; a vehicle speed detector 4 that detects a vehicle speed V; a target yaw rate determining mechanism 5 that determines a target yaw rate of the vehicle based on the steer angle $\delta$ detected by the steer angle detector 3 and the vehicle speed V detected by the vehicle speed detector 4; a yaw rate detector 6 that detects an actual yaw rate $\omega$; a lateral acceleration detector 7 that detects lateral acceleration; and a target yaw rate limit value determining mechanism 8 that individually determines target yaw rate limit values for a left turn direction and a right turn direction of the vehicle.

The vehicle speed detector 4 obtains the vehicle speed V based on a follower wheel speed detected by wheel speed detector 9. The vehicle speed V and the steer angle δ obtained by the steer angle detector 3 are inputted into a driver demand yaw rate calculator 10. In this driver demand yaw rate calculator 10, a driver demand yaw rate ωdr is calculated in accordance with the following formula:

$$\omega dr = LPF(v)[\delta \cdot K\omega(v)].$$

Figure 2:
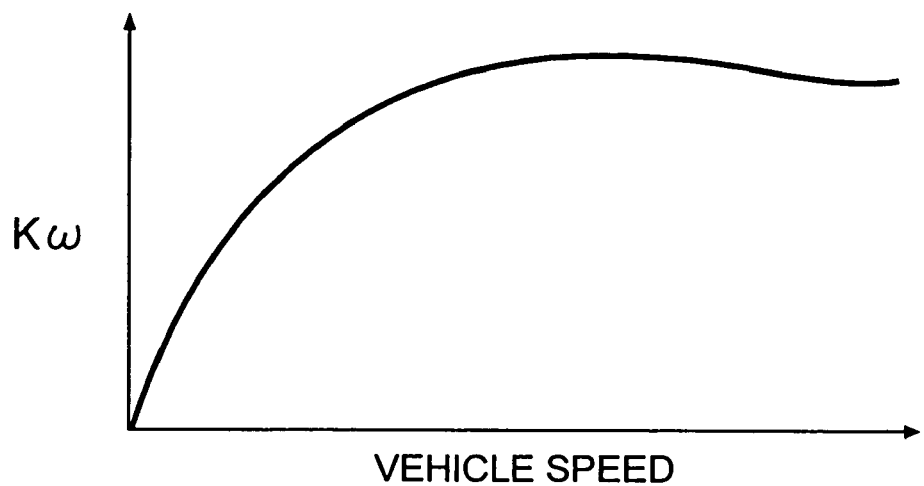
FIG. 2 is a diagram showing a yaw rate gain setting map according to an embodiment of the present invention.
Figure 3:
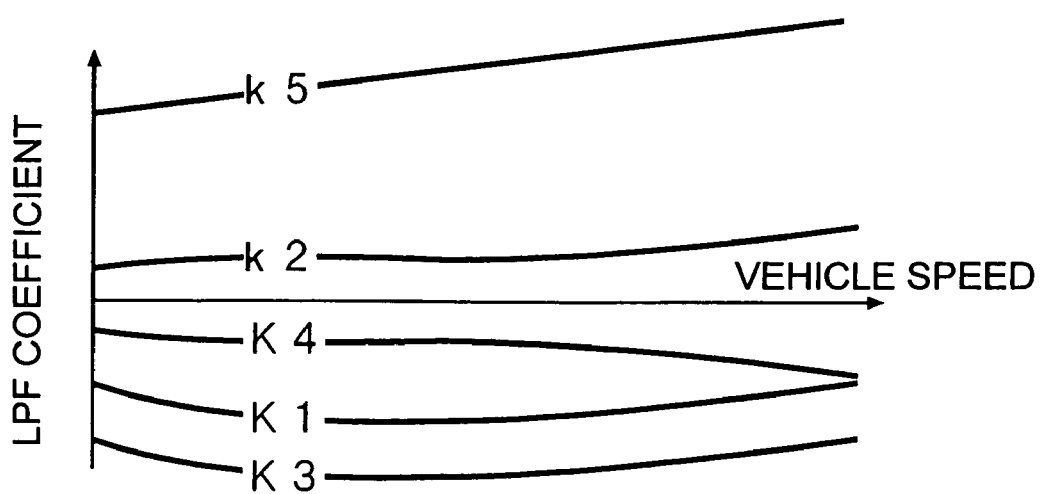
FIG. 3 is a diagram showing a setting map for a coefficient of a variable vehicle speed secondary filter according to an embodiment of the present invention.

Here, Kω(v) is a yaw rate gain which changes in accordance with the vehicle speed as shown in FIG. 2; LPF (v) is a vehicle speed variable secondary filter; and coefficients k1 to k5 are set to change in accordance with the vehicle speed as shown in FIG. 3. The driver demand yaw rate ωdr obtained by the driver demand yaw rate calculator 10 is inputted into the target yaw rate determining mechanism 5.

The target yaw rate limit value determining mechanism 8 comprises: a lateral acceleration calculator 11, which calculates lateral acceleration for determining the target yaw rate limit value based on the detected lateral acceleration from the lateral acceleration detector 7; a lateral acceleration peak value calculator 12 that calculates a peak value of the lateral acceleration based on the lateral acceleration obtained by the lateral acceleration calculator 11; and a target yaw rate limit value calculator 13 that calculates a target yaw rate limit value based on the lateral acceleration peak value obtained by the lateral acceleration peak value calculator 12 and the detected vehicle speed V from the vehicle speed detector 4.

Figure 4:
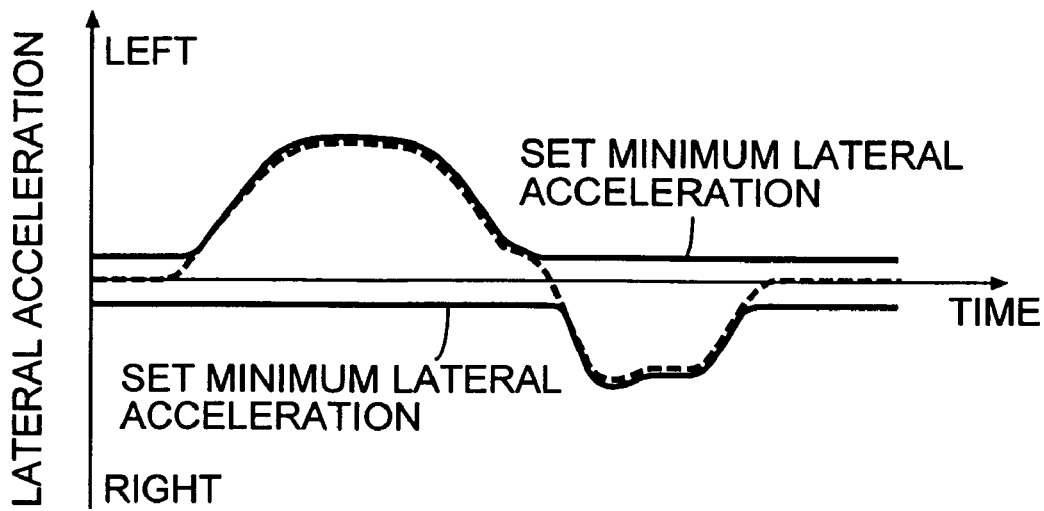
FIG. 4 is a diagram for explaining correlation between lateral acceleration and a target yaw rate limit value according to an embodiment of the present invention.

The lateral acceleration calculator 11 calculates the lateral acceleration for the target yaw rate limit values in the left and the right directions while further determining a predetermined set minimum lateral acceleration in the direction opposite from that of the detected lateral acceleration, based on the detected lateral acceleration from the lateral acceleration detector 7. As shown in FIG. 4, when the detected lateral acceleration from the lateral acceleration detector 7 changes as shown by the broken line, the lateral acceleration for the target yaw rate limit value is also determined for the direction opposite to that of the detected lateral acceleration, assuming that the set minimum lateral acceleration also occurs in the direction opposite to that of the detected lateral acceleration. In FIG. 4, in the portion where the detected lateral acceleration from the lateral acceleration detector 7 and the calculated lateral acceleration from the calculator 11 overlap each other, the detected lateral acceleration from the lateral acceleration detector 7 is depicted to be aligned in parallel with the calculated lateral acceleration for easier recognition.

Figure 5:
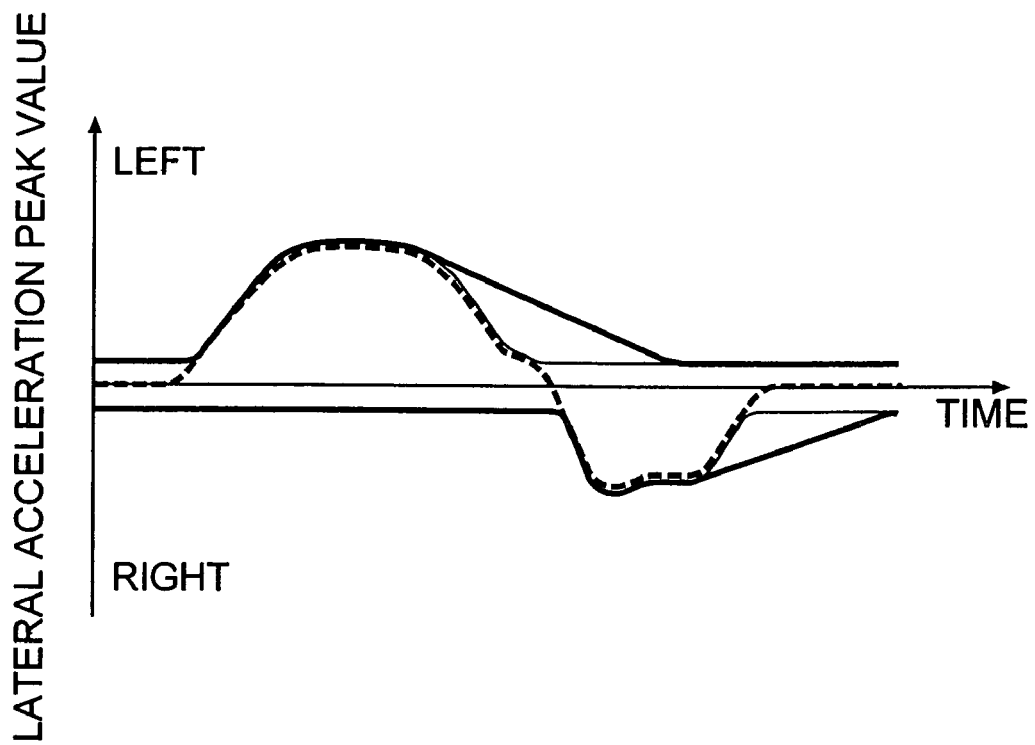
FIG. 5 is a diagram for explaining a peak value of the lateral acceleration with time according to an embodiment of the present invention.

The lateral acceleration peak value calculator 12 calculates the peak values of the lateral acceleration in the left and right directions while reducing the lateral acceleration for the target yaw rate limit value obtained by the lateral acceleration calculator 11 for the target yaw rate limit value gradually with a constant gradient to the set minimum lateral acceleration at the time of abrupt reduction. As shown in FIG. 5, where the detected lateral acceleration from the lateral acceleration detector 7 is depicted by the broken line, and the calculated lateral acceleration from the acceleration calculator 11 for the target yaw rate limit value is depicted by the thin solid line, the peak values of the lateral acceleration in the left and the right directions shown by the thick solid lines are obtained by the lateral acceleration peak value calculator 12. In FIG. 5, in the portion where the detected lateral acceleration from the lateral acceleration detector 7, the calculated lateral acceleration from the calculator 11 and the peak values of the lateral acceleration overlap one another, the detected lateral acceleration is depicted to be aligned in parallel with the calculated lateral acceleration from the calculator 11 and the peak values of the lateral acceleration for easier recognition.

In the target yaw rate limit value calculator 13, the target yaw rate limit value in the left turn direction is obtained by a ratio of (left side lateral acceleration peak value/vehicle speed) and a target yaw rate limit value in the right turn direction is obtained by a ratio of (right side lateral acceleration peak side/vehicle speed) based on the detected vehicle speed V from the vehicle speed detector 4 and the peak values of the acceleration in the left and right directions obtained by the lateral acceleration peak value calculator 12 of the target yaw rate limit value determining mechanism 8.

Namely, in the target yaw rate limit value determining mechanism 8, the target yaw rate limit values are individually determined for the left turn direction and the right turn direction of the vehicle based on the predetermined set minimum lateral acceleration set in the direction opposite from that of the detected lateral acceleration, and the target yaw rate limit values in the left turn direction and the right turn direction which are obtained by the target yaw rate limit value determining mechanism 8 are inputted into the target yaw rate determining mechanism 5.

Figure 6:
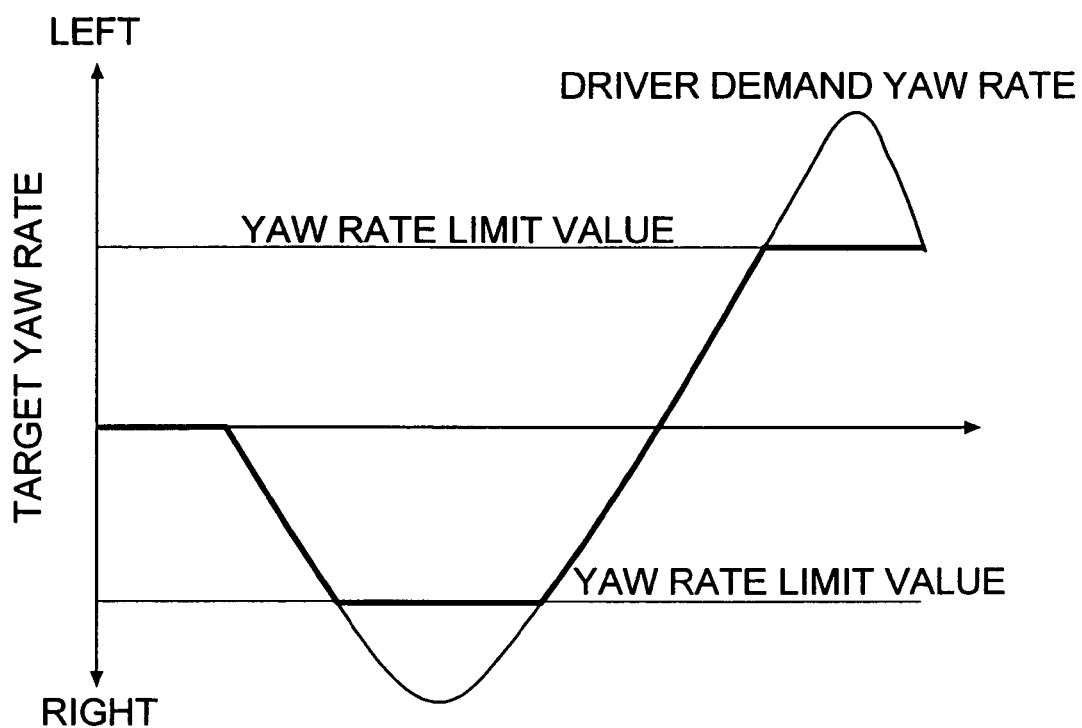
FIG. 6 is a diagram for explaining a target yaw rate calculation according to an embodiment of the present invention.

In the target yaw rate determining mechanism 5, the driver demand yaw rate ωdr calculated by the driver demand yaw rate calculator 10 is basically set as a target yaw rate, but when the driver demand yaw rate ωdr becomes at least as large as the target yaw rate limit values or more in the left turn direction and the right turn direction, which are obtained by the target yaw rate limit value determining mechanism 8, the target yaw rates in the left turn direction and the right turn direction are determined so that the target yaw rates are determined as the target yaw rate limit values in the left turn direction and the right turn direction. Therefore, as shown by the thick solid line in FIG. 6, the target yaw rate is determined while limiting the target yaw rate by the target yaw rate limit values in the left turn direction and the right turn direction determined by the target yaw rate limit value determining mechanism 8.

At a summing point 14, see FIG. 1, the detected actual yaw rate ω from the yaw rate detector 6 is subtracted from the target yaw rate obtained by the target yaw rate determining mechanism 5. Namely, at the summing point 14, a yaw rate deviation that is the deviation between the target yaw rate and the actual yaw rate ω is obtained, and the yaw rate deviation is inputted into the actuator controller 2.

Meanwhile, the detected lateral acceleration from the lateral acceleration detector 7 is inputted into a road surface friction coefficient estimator 15 (described as road surface μ estimation in FIG. 1) that estimates the friction coefficient of a road surface based on the lateral acceleration, and the friction coefficient obtained by the road surface friction coefficient estimator 15 is inputted into control gain calculator 16 that calculates a control gain of the actuator controller 2 in accordance with the friction coefficient. In addition, the control gain obtained by the control gain calculator 16 is also inputted into the actuator controller 2.

The actuator controller 2 is constituted of a moment calculator 17 that performs moment calculation by PID control arithmetical operation corresponding to a yaw rate deviation, and a brake pressure calculator 18 that calculates brake pressure based on the moment calculation value. The yaw rate deviation obtained at the summing point 14 and the control gain obtained by the control gain calculator 16 are inputted into the moment calculator 17, and the operation of the actuator 1 is controlled so as to provide the brake pressure which has been obtained by the brake pressure calculator 18.

Figure 7:
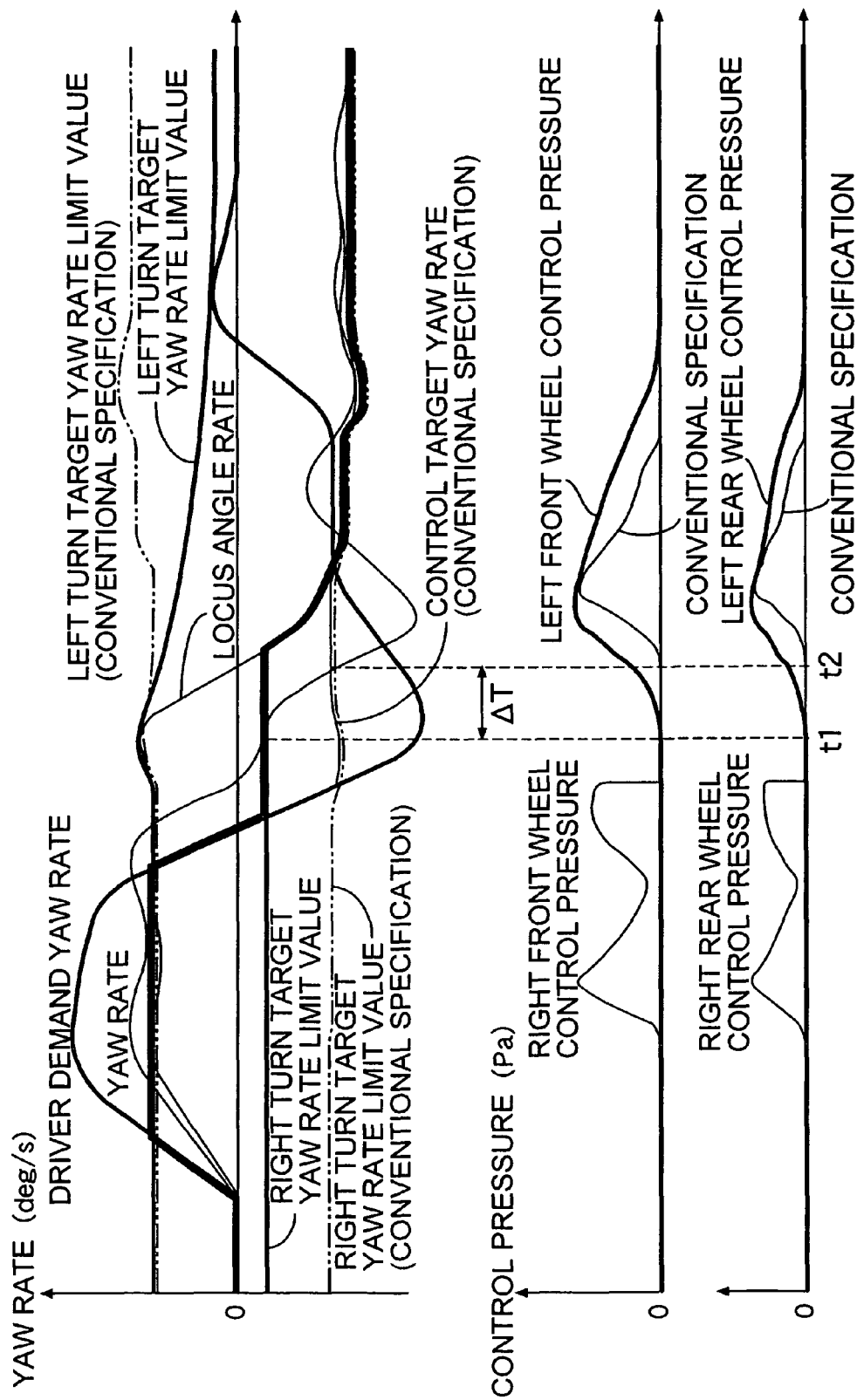
FIG. 7 is a timing chart comparing a control device according to the present invention and according to a conventional specification.

Next, an operation of this embodiment will be described with reference to a timing chart shown in FIG. 7. The timing chart shows: change in driver demand yaw rate; change in the actual yaw rate and the locus angle rate with respect to the control target yaw rate determined by the driver demand yaw rate and the left and right turn target yaw rate limit values; and change in the left and right front wheel control pressures and the left and right rear wheel control pressures, in the case where the driver performs an abrupt steering operation at a large steer angle which causes a phase difference to the yaw rate and lateral acceleration in the process of braking the right front wheel and the right rear wheel in order to perform an over steer control in the left turn direction.

Thus, according to the present invention, a predetermined set minimum lateral acceleration is also set in a direction opposite from that of the detected lateral acceleration without need of converting the lateral acceleration obtained by the lateral acceleration detector 7 into an absolute value; the target yaw rate limit values are individually determined for the left turn direction and the right turn direction based on the set minimum lateral acceleration, a detected lateral acceleration from the lateral acceleration detector 7 and the detected vehicle speed; and the target yaw rates in the left turn direction and the right turn direction are determined while limiting them by the target yaw rate limit values. Therefore, as shown by the thick solid line, the target yaw rate in the right turn direction determined after the above-described steering becomes smaller than the target yaw rate of the device according to the conventional specification, which is shown by the two-dot chain line, so that the point of time t1 at which the actual yaw rate becomes at least as large as the target yaw rate occurs earlier by a time ΔT than a point of time t2 at which the actual yaw rate becomes at least as large as the target yaw rate in the device according to the conventional specification.

Therefore, as shown by the thick solid line, the over steer control is started at an early timing, and the control pressures of the left front wheel and the left rear wheel are increased earlier as compared with that of the device according to the conventional specification, which is shown by the thin solid line. With this operation, even if the driver performs an abrupt steering operation at a large steer angle which causes a phase difference to the yaw rate and the lateral acceleration, the vehicle body behavior is stabilized without disturbing the vehicle body behavior.

An exemplary embodiment of the present invention has been described above, but the present invention is not limited thereto, and various design changes can be made without departing from the present invention described in claims.

For example, the embodiment has been described with reference to the device which performs the motion state control of the vehicle by changing the brake pressure of the wheel brake. However, the present invention is also applicable to any device which performs the motion state control of the vehicle by driving force control of each wheel, and is also applicable to any device which performs the motion state control of the vehicle by combining the brake force and the driving force control of the wheels.

What is claimed is:

1. A vehicle motion state control device comprising:
a steer angle detector which detects a steer angle;
a vehicle speed detector which detects a vehicle speed;
a target yaw rate determining mechanism which determines a target yaw rate of a vehicle based on the detected steer angle and the detected vehicle speed;
a yaw rate detector which detects an actual yaw rate;
an actuator operable to regulate a vehicle motion state;
an actuator controller which controls the actuator so that the detected actual yaw rate approaches the target yaw rate;
a lateral acceleration detector which detects lateral acceleration; and
a target yaw rate limit value determining mechanism which individually determines distinct target yaw rate limit values for a left turn direction and a right turn direction of the vehicle based on the detected lateral acceleration, the detected vehicle speed, and a predetermined limit lateral acceleration set in a direction opposite to that of the detected lateral acceleration;
wherein the target yaw rate determining mechanism determines the target yaw rates for the left turn direction and the right turn direction while limiting them by the target yaw rate limit values for the left turn direction and the right turn direction determined by the target yaw rate limit value determining mechanism.

2. The vehicle motion state control device according to claim 1, wherein the target yaw rate limit value determining mechanism determines the target yaw rate limit values for the left turn direction and the right turn direction based on the detected vehicle speed and peak values of the lateral acceleration in left and right directions which are determined so that values in the left and the right directions of the detected lateral acceleration are gradually reduced at a time of abrupt reduction.

3. The vehicle motion state control device according to claim 1, wherein
the target yaw rate limit value determining mechanism comprises:
a lateral acceleration calculator which calculates lateral acceleration for determining the target yaw rate limit values based on the detected lateral acceleration;
a lateral acceleration peak value calculator that calculates a peak value of the lateral acceleration based on the lateral acceleration obtained by the lateral acceleration calculator; and
a target yaw rate limit value calculator that calculates the target yaw rate limit value based on the lateral acceleration peak value obtained by the lateral acceleration peak value calculator and the detected vehicle speed.

4. The vehicle motion state control device according to claim 1, wherein the actuator is adapted to regulate a brake pressure of the vehicle.

5. The vehicle motion state control device according to claim 1, further comprising a driver demand yaw rate calculator which calculates a driver demand yaw rate based on the detected steer angle and the detected vehicle speed, and outputs the driver demand yaw rate to the target yaw rate determining mechanism.

6. The vehicle motion state control device according to claim 1, further comprising a control gain calculator which calculates a control gain based on the detected lateral acceleration, and outputs the control gain to the actuator controller.

7. The vehicle motion state control device according to claim 6, further comprising a road surface coefficient estimator which estimates a road surface coefficient based on the detected lateral acceleration,
wherein the control gain calculator receives an output of the road surface coefficient estimator and calculates the control gain based on the estimated road surface coefficient.

8. The vehicle motion state control device according to claim 1, wherein the vehicle motion state control device is operable such that an oversteer control operation is initiated when it is determined that a steering operation causing a phase difference to the actual yaw rate and the lateral acceleration is performed.

9. A method of controlling motion state of a vehicle, said method comprising the steps of:
   detecting a steer angle;
   detecting a vehicle speed;
   determining a target yaw rate of a vehicle based on the detected steer angle and the detected vehicle speed;
   detecting an actual yaw rate;
   regulating detected actual yaw rate such that it approaches the target yaw rate, by using an actuator controller;
   detecting lateral acceleration; and
   individually determining distinct target yaw rate limit values for a left turn direction and a right turn direction of the vehicle based on the detected lateral acceleration, the detected vehicle speed, and a predetermined limit lateral acceleration set in a direction opposite to that of the detected lateral acceleration, wherein the target yaw rates for the left turn direction and the right turn direction are determined while limiting them by the target yaw rate limit values for the left turn direction and the right turn direction; and
   initiating an oversteer control operation when it is determined that a steering operation causing a phase difference to the actual yaw rate and the lateral acceleration is performed.

10. A method of controlling motion state of a vehicle according to claim 9, wherein the target yaw rate limit values for the left turn direction and the right turn direction are determined based on the detected vehicle speed, and peak values of the lateral acceleration in left and right directions are determined so that values in the left and the right directions of the detected lateral acceleration are gradually reduced at a time of abrupt reduction.

* * * * *